Figure 1:
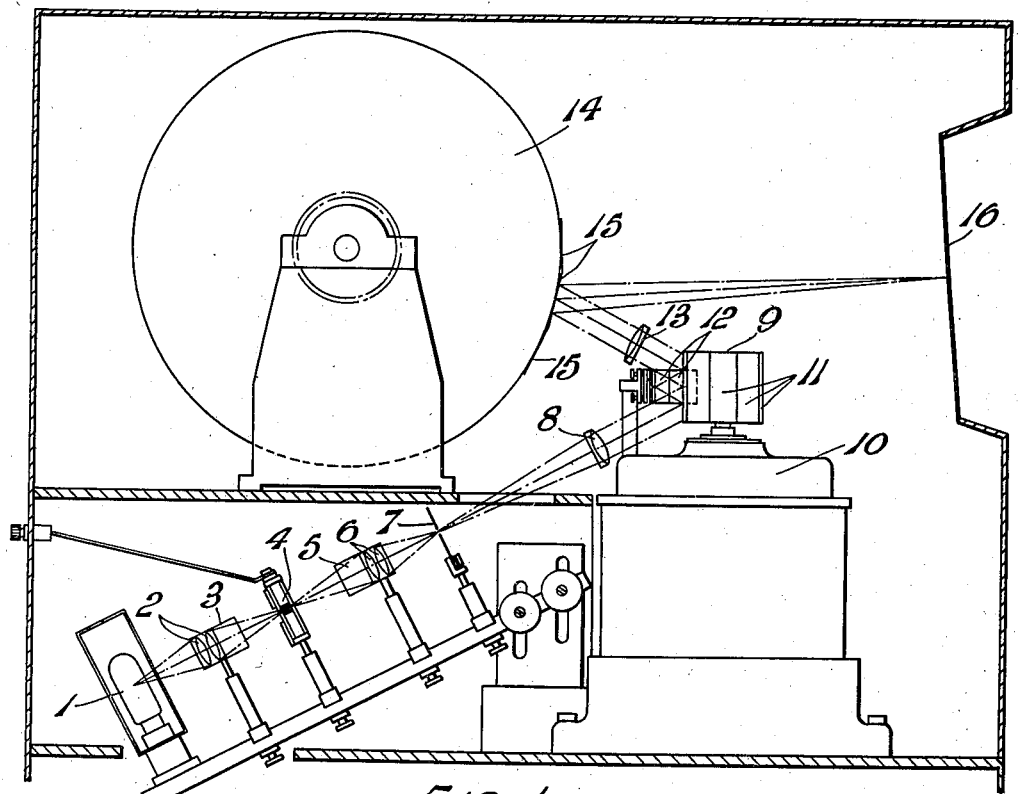

Dec. 13, 1938.  E. TRAUB  2,139,869
SCANNING DEVICE FOR TELEVISION APPARATUS
Filed Dec. 3, 1935  2 Sheets-Sheet 1

Inventor:
Ernest Traub,
By Thurs S. Appleman
Atty.

Dec. 13, 1938.  E. TRAUB  2,139,869

SCANNING DEVICE FOR TELEVISION APPARATUS

Filed Dec. 3, 1935  2 Sheets-Sheet 2

Inventor:
Ernest Traub,
By Franks Appleman
Attorney.

Patented Dec. 13, 1938

2,139,869

UNITED STATES PATENT OFFICE 2,139,869

SCANNING DEVICE FOR TELEVISION APPARATUS

Ernest Traub, London, England

Application December 3, 1935, Serial No. 52,710
In Great Britain December 3, 1934

7 Claims. (Cl. 178—7.6)

This invention relates to scanning devices for television apparatus of the kind comprising a high speed or line scanner for scanning the picture in one direction only and a low speed or framing scanner for scanning the picture in a direction at right angles to that of the high speed scanner.

It is well known that a device of this kind may be formed by two rotating polygonal drums having their axes perpendicular to one another, each face of each drum being formed by a mirror lying parallel to the axis of that drum. A beam of light projected onto the periphery of one of these drums (which may for convenience be referred to as the "line drum") is reflected by each mirror in turn along the same path; thus if the reflected beam were interrupted by a screen, successive illuminated lines would be traced across the screen, the same line being repeated by each of the mirrors on the periphery of the line drum. The beam of light reflected from the line drum is projected onto the periphery of the second drum, which rotates at a lower speed and may for convenience be termed the "framing drum". The beam of light reflected from the framing drum would also trace successive illuminated lines across a screen placed to intercept it, but owing to the rotation of the framing drum each of these lines is displaced vertically on the screen relatively to the preceding lines. The framing drum may be replaced by a single oscillating mirror, or by a single double-sided rotating mirror.

By suitably selecting the speeds of rotation and the numbers of mirrors on each drum of such an apparatus, it would theoretically be possible to cover the entire screen with lines of light any required number of times per second; that is to obtain any desired number of "frames" of a picture of any desired number of "lines". For example, to obtain 25 frames of a 30 line picture the framing drum might be made with 25 mirrors and rotated at 60 R. P. M., while the line drum had 30 mirrors and rotated at 1500 R. P. M. However, if it were desired to obtain high definition pictures of, say, 120 lines it would be necessary to increase the number of mirrors and/or the speed of rotation of the line drum. For example if the speed is kept at 1500 R. P. M. the number of mirrors must be increased to 120. If, as has been suggested, the drum is provided with only 12 mirrors it must be rotated at 15,000 R. P. M. Both these arrangements are subject to obvious mechanical disadvantages, which effectively prevent their successful use.

According to the present invention the high speed or line scanner of apparatus of the kind referred to comprises a rotating member having a plurality of reflecting or refracting faces and a plurality of stationary reflecting surfaces each adapted to receive a beam of light from the rotating member and reflect it back onto the rotating member, each face of the rotating member co-operating successively with each of the stationary reflecting surfaces to produce a line scan or transverse movement of the light beam. Such an arrangement is the equivalent of a drum having a number of faces equal to the product of the number of stationary mirrors and the number of reflecting or refracting faces actually provided on the rotating drum. Thus the line drum of the example given above could be replaced by a drum having only six mirrors, rotated at 1500 R. P. M. and by 20 inwardly facing fixed mirrors arranged in an arc concentric with the drum. A convenient arrangement for obtaining 25 frames of a 120 line picture would be a line drum of six mirrors rotating at 3000 R. P. M., 10 fixed mirrors, and a framing drum of 10 mirrors rotating at 150 R. P. M.

Figure 6:
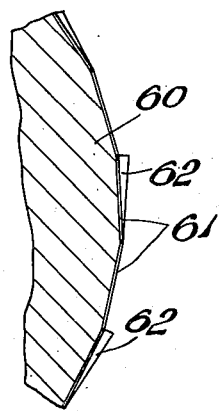
Figure 7:
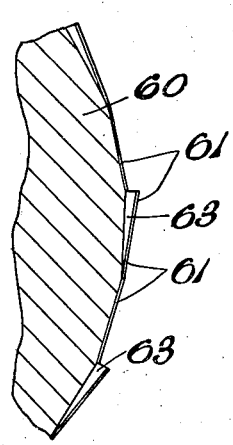
Figure 8:
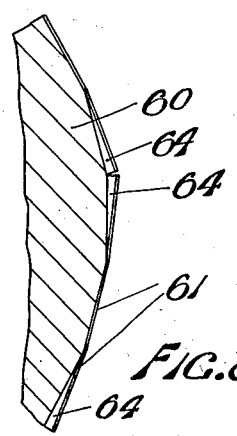
Figure 2:
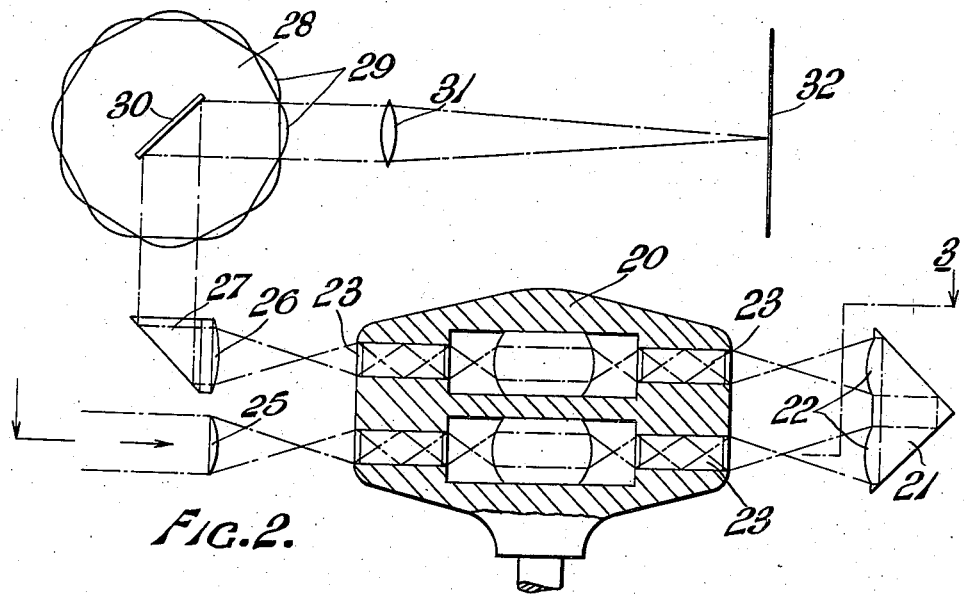
Figure 3:
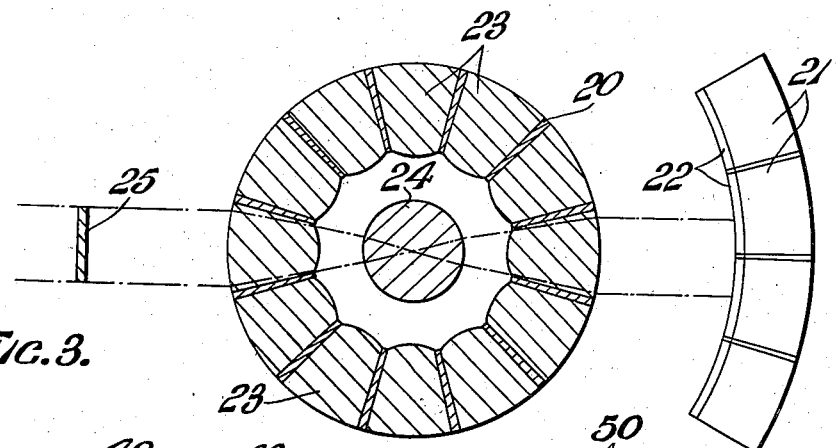
Figure 4:
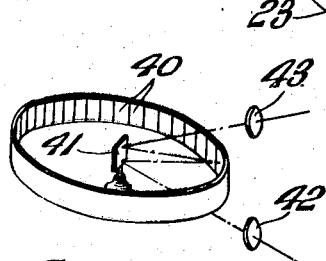
Figure 5:
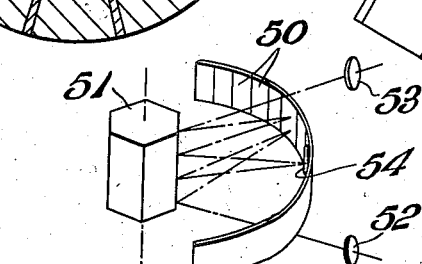

The invention may be carried out in many different forms, certain of which are illustrated in the accompanying drawings, which are somewhat diagrammatic in form. In these drawings Figure 1 is a side view of a receiving apparatus for reproducing 180 line pictures at a framing frequency of 25 per second; Figure 2 is a side view partly in section of a modified form of receiving device; Figure 3 is a section on the line 3—3 of Figure 2; Figures 4 and 5 show further alternative forms of low speed scanners; Figures 6, 7 and 8 show details of construction.

Referring first to Figure 1, light from a source 1 passes through condenser lenses 2, a polarizing prism 3, a Kerr cell or equivalent modulating device 4, a second polarizing prism 5, a second pair of lenses 6, an aperture in a screen 7, an objective lens 8 and falls on one face of a drum 9. This drum which is rotated about a vertical axis at 6000 revolutions per minute by a motor 10 has the cross section of a regular nonagon. Each of its nine faces is formed as or carries a reflecting surface 11 which is accurately parallel to the axis of the drum. The beam of light from the surface 11 falls on one of five stationary reflecting surfaces 12 all parallel to the axis of the drum 9 and is reflected back onto the surface 11. After its second reflection on the surface 11 the beam of light passes through a lens 13 into the low speed or framing scanner. As the drum 9 rotates each of the reflecting faces 11 co-operates successively with each of the stationary reflecting surfaces 12 to produce a line scan or transverse movement of the light beam. Thus each revolution of the drum 9 produces 45 line scans and with the drum rotating at 6000 R. P. M., 4500 line scans per second are obtained. The low speed scanner is formed by a second drum 14 provided with 24 reflecting faces 15 all parallel to the axis of the drum, which rotates about a horizontal axis at 62½ revolutions per minute. This speed of rotation is conveniently obtained by employing a synchronous type electric motor having 96 polar projections supplied with 50 cycle alternating current. The horizontally oscillating beam of light passing through the lens 13 falls on one of the faces 15 of this drum and is reflected onto a screen 16. Owing to the rotation of the drum 14 each horizontal line scan on the screen is displaced vertically relative to the preceding line until a complete frame of 180 lines has been formed when the next succeeding face recommences the process which is repeated at a rate of 25 per second.

It will be observed that the reflecting surfaces 15 on the low speed or framing drum are of considerably greater breadth circumferentially than is the beam of light which falls on them. Hitherto it has been usual in television practice to illuminate the faces of a rotating scanning device with a beam of light of sufficient breadth to cover completely two adjacent faces of the device. In this way each face of the rotating device is illuminated over its entire breadth during the whole of the time that it is effective, and uniform illumination of the picture is thus obtained. It is a feature of the present invention to form the faces of a rotating scanning member of such circumferential width that they receive the whole of the beam of light during substantially the whole of their effective movement. As compared with the prior practice this arrangement doubles the illumination of the picture, but preserves the uniformity of illumination of the picture, except for a period corresponding to a few lines at each of the extreme edges of the picture. As this period is usually covered or mainly covered by synchronizing signals the lack of uniformity introduced is of no great consequence.

In the construction shown in Figures 2 and 3 both the high and low speed scanners comprise lens wheels in place of the mirror drums shown in Figure 1. The high speed scanner employs a "split focus" system using cylindrical lenses. This high speed scanner comprises a twelve faced lens wheel 20 and five stationary reflecting surfaces, each formed by an internally reflecting prism 21 the front face of which is provided with two superimposed cylindrical lenses 22. Each face of the lens wheel 20 carries two superimposed cylindrical lenses 23. The lenses 23 thus form two superimposed rings each containing twelve cylindrical lenses; at the centre of each ring is a spherical lens 24. The beam of light passes to and from the lens wheel through cylindrical lenses 25 and 26 respectively. The lenses 23 have their cylindrical axes vertical, that is parallel to the axis of the lens wheel 20, while the lenses 22, 25 and 26 have their cylindrical axes horizontal. The modulated beam of light passes in succession through the lens 25, one of the lenses 23 of the lower ring, the lower spherical lens 24, the diametrically opposite lens 23, and the lower lens 22 of one of the prisms 21; it is internally reflected in that prism and then returns through the upper ring of lenses in the wheel 20 passing in succession through the lenses 22, 23, 24, 25 and 26 as indicated in the drawings. The beam of light passing through the lens 26 is turned through a right angle by the internally reflecting prism 27 and passes to the low speed or framing scanner. This low speed scanner is formed by a hollow drum 28 having twelve lenses 29 disposed around its periphery and a stationary reflecting surface 30 at its centre. The beam of light from the high speed scanner passes through one of the lenses 29 and falls on the surface 30 by which it is reflected through another of the lenses 29, lying at right angles to the lens through which the beam entered. An objective lens 31 brings the beam to a focus on a screen 32. It will be appreciated from analogy with the construction shown in Figure 1 that one rotation of the lens wheel 20 of the high speed scanner produces sixty transverse movements or line scans of the beam of light and that one rotation of the drum 28 produces twelve complete frames.

Many other modifications of the device shown in Figure 1 are also possible. For example, the reflecting faces of the rotating member of the high speed scanner may be lenticular in form. In particular they may be curved cylindrically, and the split focus system of Figures 2 and 3 employed. The high speed scanner may then be given much the form of that shown in Figures 2 and 3 except that the lenses 23 are replaced by reflecting surfaces and the stationary reflecting prisms 21 with their associated lenses are arranged on the same side of the wheel 20 as the lenses 25 and 26.

The low speed scanner may have many other forms than those shown in Figures 1 and 2. It could, for example, be formed by a single oscillating or rotating mirror. It may however be formed by adapting any known form of mechanical scanning device so that it scans in one direction only. Figure 4, for example, shows a low speed scanner formed by a single double sided rotating mirror 41 arranged at the centre of a ring of stationary mirrors 40. A beam of light projected through a lens 42 passes beneath the mirrors 40 and falls on the rotating mirror 41; it is reflected onto one of the stationary mirrors 40, which reflects it back onto the rotating mirror 41, which in turn reflects it over the upper edge of the stationary mirror ring through a lens 43. This device is similar to the scanning device described in British patent specification No. 419,120, except that the mirrors 40 are all parallel to the axis of the device instead of being inclined thereto at different angles.

Again, the low speed scanner may be similar in construction to the high speed scanner of Figure 1, which bears the same relation to the device described in British patent specification No. 425,552 as does the scanner of Figure 4 to the device of British specification No. 419,120.

Figure 5 shows a further alternative construction adapted from the device described in British patent application No. 30,748 of 1934. This arrangement is similar in principle to the high speed scanner of Figure 1, except that an additional stationary mirror 54 is provided. The light beam passing through the lens 52 is reflected in succession from one of the mirrors of the hexagonal rotating drum 51, one of the stationary mirrors 50, the drum mirror again, the additional mirror 54, the drum mirror, the stationary mirror 50 and finally the drum mirror, from which it passes though a lens 53. With this arrangement the beam of light is reflected four times at the rotating mirror, so that the screen angle is double that obtained with the same number of mirrors when the beam is reflected twice only at the rotating member. A picture of the same size may thus be obtained with the screen closer to the scanning device, with a consequent increase in illumination. This modification is also applicable to the high speed scanner.

The low speed scanner may also be formed by a lens wheel or drum. One such arrangement has already been described with reference to Figure 2, but many modifications are possible. For example, the stationary reflecting surface at the centre of the drum may be replaced by a refracting device, or it may simply be omitted, so that the light beam passes diametrically across the drum. The stationary reflecting or refracting device may be arranged to reflect the light beam through any desired angle. The lenses employed in the lens wheel may be either spherical or cylindrical.

In the foregoing description it has been assumed that the screen is to be scanned along exactly the same lines in each framing period. It is however well known to use "interlaced scanning" methods, in which the lines of every alternate frame are displaced relative to those of the remaining frames so as to be interspersed between them. Thus, if the lines forming the picture be numbered in the order in which they apear on the screen, one frame will include the lines 1, 3, 5 etc. (odd) in that order and the next frame will include the lines 2, 4, 6 etc. (even) in that order. If the apparatus of the present invention is to be employed for interlaced scanning systems the low speed scanner must be so formed that each alternate frame is displaced relative to the remaining frames by an amount equal to half the distance between successive lines of the same frame. In the low speed scanner of Figure 1, for example, this result could be obtained by making the reflecting surfaces 15 adjustable about an axis parallel to the axis of the drum and adjusting alternate surfaces to the required extent, or alternatively by forming the drum 14 with the required degree of irregularity. The desired result may however be obtained far more simply by forming the drum perfectly regularly and applying to each alternate surface a prism which will produce the necessary displacement. Figure 6 shows a portion of a drum 60 of perfectly regular polygonal cross section having reflecting surfaces 61. To allow this drum to be used for interlaced scanning, glass prisms 62 of small angle are secured on the face of each alternate reflecting surface and owing to the refraction which they introduce the required displacement of alternate frames is obtained. Figure 7 shows an alternative arrangement: here prisms 63 of any suitable material are interposed between the drum and the reflecting surfaces 61. Figure 8 shows an arrangement intended for use in triple interlaced scanning systems in which the complete picture is scanned once in every three frames: here every third reflecting surface is provided with a prism 63, the next adjacent surfaces have no prism, while the remaining surfaces are provided with prisms 64 which are reversed in position. It will be appreciated that in each of these arrangements all the prisms employed are identical in shape, so that manufacturing difficulties are greatly reduced. The application of this method of providing for interlaced scanning to other forms of low speed scanners will be clear without further description.

Apparatus in accordance with the invention is readily adaptable to the production of images in natural colours. For this purpose the mirrors or lenses of the low speed scanner are coloured or are provided with colour filters, so arranged that successive images are of different primary colours, the successive images blending together in the eye of the observer to produce the required picture. For example, in the low speed scanner illustrated in Figure 2, the twelve lenses 29 may be made of the three colours red, green and blue alternately, so that images of these colours will be produced alternately. It is of course essential to arrange, as shown in Figure 2, that the number of lenses on the drum should be divisible by the number of colours employed and that the beam of light should enter and leave the drum through lenses of the same colour. The method of adapting other forms of low speed scanner to the production of coloured pictures will be clear without further description.

In the design of apparatus in accordance with the present invention care must be taken to select the number of reflecting or refracting faces on the various members and their relative positions, in such a way that a picture of the desired shape is obtained. In this connection the following point should be borne in mind. When a polygonal drum having, say, 45 reflecting faces is used in the known way for effecting scanning in one direction, the screen angle in the direction of scanning is 16°. When, however this 45-faced drum is replaced by a nine-faced drum and five stationary mirrors, as in the high speed scanner of Figure 1, the beam of light is twice reflected at the rotating member and the screen angle is consequently doubled, becoming 32°. Moreover, if the modified arrangement shown in Figure 5 is applied to such an assembly of nonagon drum and five stationary mirrors, there are four successive reflections at the surface of the rotating drum and the screen angle becomes 64°. In each case the number of reflecting or refracting surfaces on the low speed scanners and the screen must be so selected that a picture of the desired shape is obtained; the standard shaped picture measures across the lines of scanning ⅝ths of its measurement along the lines. The speed of rotation of the framing drum is chosen with regard to the number of faces upon it so as to give the required number of frames per second.

While the invention has been particularly described with reference to receiving devices, it can also be applied to transmitting devices. The modifications necessary for this purpose will be clear without further description to those skilled in the art to which this invention relates.

What I claim and desire to secure by Letters Patent is:—

1. A scanning device for television apparatus comprising a high speed scanner for scanning the picture in one direction only and a low speed scanner for scanning the picture in a direction at right angles to that of said high speed scanner, said high speed scanner comprising a rotating member having a plurality of faces and a stationary member having a plurality of reflecting surfaces, said stationary member comprising a light beam multiplier, each surface of said stationary member being adapted to receive a beam of light from said rotating member, and to reflect said beam back to said rotating member, each face of said rotating member cooperating successively with each reflecting surface of said stationary member to produce a line scan comprising a transverse movement of said light beam.

2. The structure of claim 1, said rotating member comprising a polygonal drum, the faces of said drum being provided with reflecting surfaces, all of said reflecting surfaces of drum being equally inclined to the axis of the same.

3. A device for the composition or decomposition of pictures comprising a plurality of stationary reflecting members comprising a light beam multiplier and a polygonal rotating member having a plurality of faces, said stationary and rotating members together forming a high speed line scanner, a low speed framing scanner, and means for projecting a beam of light successively to the faces of said rotating member, thence onto said stationary reflecting members, thence back to the faces of said rotating member and thence to said low speed scanner.

4. A device for the composition or decomposition of pictures comprising a plurality of stationary reflecting members comprising a light beam multiplier and a polygonal rotating member having a plurality of reflecting faces, all of the faces of said rotating and stationary members lying parallel to the axis of rotation of said rotating member, said stationary and rotating members together forming a high speed line scanner, a low speed framing scanner, and means for projecting a beam of light successively onto the faces of said rotating member, thence onto said stationary reflecting members, thence back onto the faces of said rotating member and thence onto said low speed scanner.

5. A device for the composition and decomposition of pictures comprising a plurality of stationary reflecting members comprising a light beam multiplier and a polygonal rotating member having a plurality of reflecting faces, all of said faces of both members lying parallel to the axis of rotation of said rotating member, said stationary and rotating members together forming a high speed line scanner, a second rotating polygonal member having a plurality of faces all lying parallel to the axis of rotation thereof and forming a low speed framing scanner, and means for projecting a beam of light successively onto the faces of said first rotating member, thence onto said stationary reflecting members, thence back onto the faces of said first rotating member and thence onto the faces of said low speed scanner.

6. In a television scanning device, a high speed line scanner comprising a polygonal drum having a plurality of faces, two superimposed cylindrical lenses contained in each of said faces, a plurality of stationary internally reflecting prisms comprising a light beam multiplier and each adapted to receive in turn a beam of light from one of said cylindrical lenses and reflect it back onto the other of said cylindrical lenses.

7. In a television scanning device, a low speed framing scanner comprising a hollow rotating drum, a plurality of lenses spaced around the periphery of said drum, and a stationary reflecting member arranged within said drum and adapted to receive a beam of light passing through one of said lenses and to reflect it through another of said lenses.

ERNEST TRAUB.